(12) United States Patent
Yao

(10) Patent No.: US 12,409,906 B2
(45) Date of Patent: Sep. 9, 2025

(54) BATTERYLESS ELECTRIC BICYCLE BASED OPERATION METHOD, COMPUTER PROGRAM, AND SYSTEM

(71) Applicant: Li-Ho Yao, Taipei (TW)

(72) Inventor: Li-Ho Yao, Taipei (TW)

(\*) Notice: Subject to any disclaimer, the term of this patent is extended or adjusted under 35 U.S.C. 154(b) by 226 days.

(21) Appl. No.: 17/978,217

(22) Filed: Nov. 1, 2022

(65) Prior Publication Data

US 2023/0139851 A1 May 4, 2023

(30) Foreign Application Priority Data

Nov. 2, 2021 (TW) .................................. 110140809

(51) Int. Cl.
*B62J 45/20* (2020.01)
*B62J 50/21* (2020.01)
*B62J 50/22* (2020.01)
*G06Q 30/018* (2023.01)
*G06Q 30/0645* (2023.01)

(52) U.S. Cl.
CPC .............. *B62J 45/20* (2020.02); *B62J 50/22* (2020.02); *B62J 50/225* (2020.02); *G06Q 30/018* (2013.01); *G06Q 30/0645* (2013.01)

(58) Field of Classification Search
CPC .......... B62J 45/20; B62J 50/22; B62J 50/225; G06Q 30/018; G06Q 30/0645
USPC .......................................................... 701/22
See application file for complete search history.

(56) References Cited

U.S. PATENT DOCUMENTS

| 5,857,537 A | \* | 1/1999 | Matsumoto | B62M 6/60 |
| | | | | 180/65.285 |
| 6,734,376 B2 | \* | 5/2004 | Ichida | H01H 23/30 |
| | | | | 200/332.2 |
| 7,192,169 B2 | \* | 3/2007 | Takeda | B62J 6/015 |
| | | | | 362/475 |

(Continued)

FOREIGN PATENT DOCUMENTS

| CN | 109147197 A | \* | 1/2019 |
| CN | 109426999 A | \* | 3/2019 |

(Continued)

*Primary Examiner* — Luis A Martinez Borrero
(74) *Attorney, Agent, or Firm* — Leong C. Lei

(57) ABSTRACT

A batteryless electric bicycle based operation method, computer program, and system are disclosed. The system includes a server device, at least one electricity-connecting detection device mounted on the electric bicycle, and at least one mobile electric power computation device carriable by a user, and application steps include the electricity-connecting detection device of the electric bicycle detecting the mobile electric power computation device forming electric connection therewith; registration data of the mobile electric power computation device and the electricity-connecting detection device being transmitted to the server device for authentication; the mobile electric power computation device being notified upon successful authentication to supply electricity to the electric bicycle to be used thereby; the electricity-connecting detection device detecting at least one operation parameter of the electric bicycle; transmitting the operation parameter to the server device and the mobile electric power computation device; and applying the operation parameter to accomplish an operation task.

8 Claims, 3 Drawing Sheets

(56) References Cited

U.S. PATENT DOCUMENTS

| | | | | |
|---|---|---|---|---|
| 7,386,482 | B2* | 6/2008 | Kokatsu | B60L 58/12 |
| | | | | 705/26.61 |
| 8,634,979 | B2* | 1/2014 | Chien | B62M 6/45 |
| | | | | 280/282 |
| 8,899,366 | B2* | 12/2014 | Yao | B62J 50/22 |
| | | | | 180/220 |
| 8,949,022 | B1* | 2/2015 | Fahrner | G01C 21/20 |
| | | | | 340/995.19 |
| 9,358,955 | B2* | 6/2016 | Simonazzi | G07F 15/005 |
| 9,676,263 | B2* | 6/2017 | Larray | B62M 6/90 |
| 10,093,379 | B2* | 10/2018 | Hines | B62J 50/21 |
| 10,336,393 | B2* | 7/2019 | Gerhardt | B62K 21/16 |
| 10,499,699 | B2* | 12/2019 | Chen | B62H 5/00 |
| 10,926,824 | B2* | 2/2021 | Hines | B62J 43/20 |
| 11,049,183 | B1* | 6/2021 | Clauss | G06Q 40/08 |
| 11,117,548 | B2* | 9/2021 | Leiber | G06Q 10/02 |
| 11,524,603 | B2* | 12/2022 | Zhang | H04W 4/44 |
| 11,783,348 | B2* | 10/2023 | O'Keefe | G06Q 30/0224 |
| | | | | 705/14.25 |
| 11,936,412 | B2* | 3/2024 | Ford | H04W 4/40 |
| 11,949,075 | B2* | 4/2024 | Nakhjiri | B60L 53/65 |
| 12,015,434 | B2* | 6/2024 | Miller | H04B 1/3822 |
| 12,015,435 | B2* | 6/2024 | Miller | G07F 17/0057 |
| 2004/0095092 | A1* | 5/2004 | Ta-Shuo | H02J 7/1407 |
| | | | | 320/104 |
| 2008/0071436 | A1* | 3/2008 | Dube | B62M 6/50 |
| | | | | 701/22 |
| 2009/0181826 | A1* | 7/2009 | Turner | B62M 6/50 |
| | | | | 482/4 |
| 2010/0198453 | A1* | 8/2010 | Dorogusker | G06F 1/1626 |
| | | | | 340/427 |
| 2011/0307394 | A1* | 12/2011 | Rzepecki | G07F 17/0057 |
| | | | | 705/13 |
| 2013/0338865 | A1* | 12/2013 | Kryze | B60L 50/20 |
| | | | | 701/22 |
| 2014/0209400 | A1* | 7/2014 | Yao | B62M 6/45 |
| | | | | 180/167 |
| 2016/0107517 | A1* | 4/2016 | Larray | B60K 1/04 |
| | | | | 180/220 |
| 2016/0221627 | A1* | 8/2016 | Hines | B62K 23/02 |
| 2016/0257269 | A1* | 9/2016 | Watarai | B62J 43/13 |
| 2017/0021897 | A1* | 1/2017 | Bortolozzo | B62J 50/22 |
| 2018/0154980 | A1* | 6/2018 | Lee | B60L 50/20 |
| 2018/0194421 | A1* | 7/2018 | Hines | B62J 45/20 |
| 2018/0290702 | A1* | 10/2018 | Carlier | B62J 45/20 |
| 2018/0334216 | A1* | 11/2018 | Montez | B62J 50/225 |
| 2019/0244284 | A1* | 8/2019 | Miwa | G06Q 50/10 |
| 2020/0092128 | A1* | 3/2020 | Chuang | B62M 6/45 |
| 2020/0180719 | A1* | 6/2020 | Chadwick | B62J 50/22 |
| 2020/0223513 | A1* | 7/2020 | Ho | B62M 25/04 |
| 2020/0353840 | A1* | 11/2020 | Zhang | H04L 67/125 |
| 2021/0023952 | A1* | 1/2021 | Sussna | B60L 15/2045 |
| 2021/0178907 | A1* | 6/2021 | Murphy | B60L 7/02 |
| 2021/0291922 | A1* | 9/2021 | Hines | B62J 43/20 |
| 2021/0344051 | A1* | 11/2021 | Nakhjiri | B62M 6/90 |
| 2021/0402883 | A1* | 12/2021 | Bender | B60L 50/20 |
| 2022/0158851 | A1* | 5/2022 | Shin | G06Q 50/40 |
| 2022/0306043 | A1* | 9/2022 | Ford | B62H 5/08 |
| 2022/0306044 | A1* | 9/2022 | Stephens | B60R 25/102 |
| 2022/0306226 | A1* | 9/2022 | Miller | B62H 5/14 |
| 2022/0306237 | A1* | 9/2022 | Miller | B62J 50/20 |
| 2022/0311468 | A1* | 9/2022 | Stephens | H04W 4/80 |
| 2023/0005309 | A1* | 1/2023 | Tarman | E05B 67/063 |
| 2023/0109945 | A1* | 4/2023 | Garnica | B62J 45/20 |
| | | | | 701/51 |

FOREIGN PATENT DOCUMENTS

| | | | |
|---|---|---|---|
| CN | 208985293 U | * | 6/2019 |
| WO | WO-2019181583 A1 | * | 9/2019 |

* cited by examiner

BATTERYLESS ELECTRIC BICYCLE BASED OPERATION METHOD, COMPUTER PROGRAM, AND SYSTEM

CROSS-REFERENCE TO RELATED APPLICATIONS

The Application claims priority to Taiwan Patent No. TW110140809.

TECHNICAL FIELD OF THE INVENTION

The present invention relates generally to the technical field of management of operation of an electric bicycle, specifically a batteryless electric bicycle based operation method, computer program, and system, and more particularly to a system that controls activation and operation of an electric bicycle, electricity trading, and carbon credit computation by means of a computer program, for resolving issues of high costs and energy waste of built-in batteries, so as to fulfill effects of easiness and universality of use and also to encourage and respond to environmental protection.

DESCRIPTION OF THE PRIOR ART

For small-sized electric bicycles for mobility-assisting purposes, such as electric scooter, a power bike, a power-assisting bicycle, or an electric scooter board, such a kind of small-sized electric bicycles is equipped with a built-in battery to supply electric power for driving a motor.

However, for an electric bicycle equipped with a battery built in a vehicle body thereof, in addition to adding battery cost and vehicle loading, it is even worse that the time that people spend in riding an electric bicycle is often short, leaving the battery long idling, and this results in an issue of loss caused by draining of power, leading to unattended wastage of energy.

Contemporary electric bicycles are equipped with a battery or batteries of 300-500 watts. Taking the tens of millions of electric bicycles currently used in the Europe as an example, they involve an amount of electric power that is around 5 thousand million watts, and this corresponds to the power of a fired power plant. The battery of each bicycle, once fully charged, allows for riding for 70 kilometers or so, yet more than 85% of the users ride for a distance shorter than 15 kilometers every day. This means, for each day, around 3.4 thousand million watts of electric power are idling and potentially losing, leading to loss and wastage of energy. It is an important issue today to make a change to the battery idling problem for non-operating conditions in order to resolve the issue of high expenditure of batteries and waste of energy, and this is also the issue that the present invention aims to explore.

SUMMARY OF THE INVENTION

The primary objective of the present invention is to reduce loading and battery cost for an electric bicycle by enabling a user to activate operation of the electric bicycle with a mobile electric power computation device, and also to avoid long idling of the battery in order to reduce wastage of energy.

A second primary objective of the present invention is to unlock and activate an electric bicycle by means of remote pairing, in order to enhance shareability and easiness of the use thereof, and also to fulfill an effect of being burglarproof.

A further primary objective of the present invention is to implement calculation and trading of carbon credit of an electric bicycle by means of a server device or a mobile electric power computation device, so as to build up carbon-reduced economy and to enhance the consciousness of environmental protection.

A further primary objective of the present invention is to create common-sharing economy by allowing the mobile electric power computation device to implement conversion of digital currency necessary for trading by means of the server device.

A further primary objective of the present invention is to allow the mobile electric power computation device to implement trading for sharing an electric bicycle in order to create an economic effect therefor.

A further primary objective of the present invention is to allow the mobile electric power computation device to be completely detached from an electric bicycle for easy carrying and for subsequent use in other electricity-driving equipment, making it not idling and achieving full exploitation of the stored electricity thereof, so as to ensure full use of the energy asset.

DETAILED DESCRIPTION OF THE PREFERRED EMBODIMENT

Figure 1:
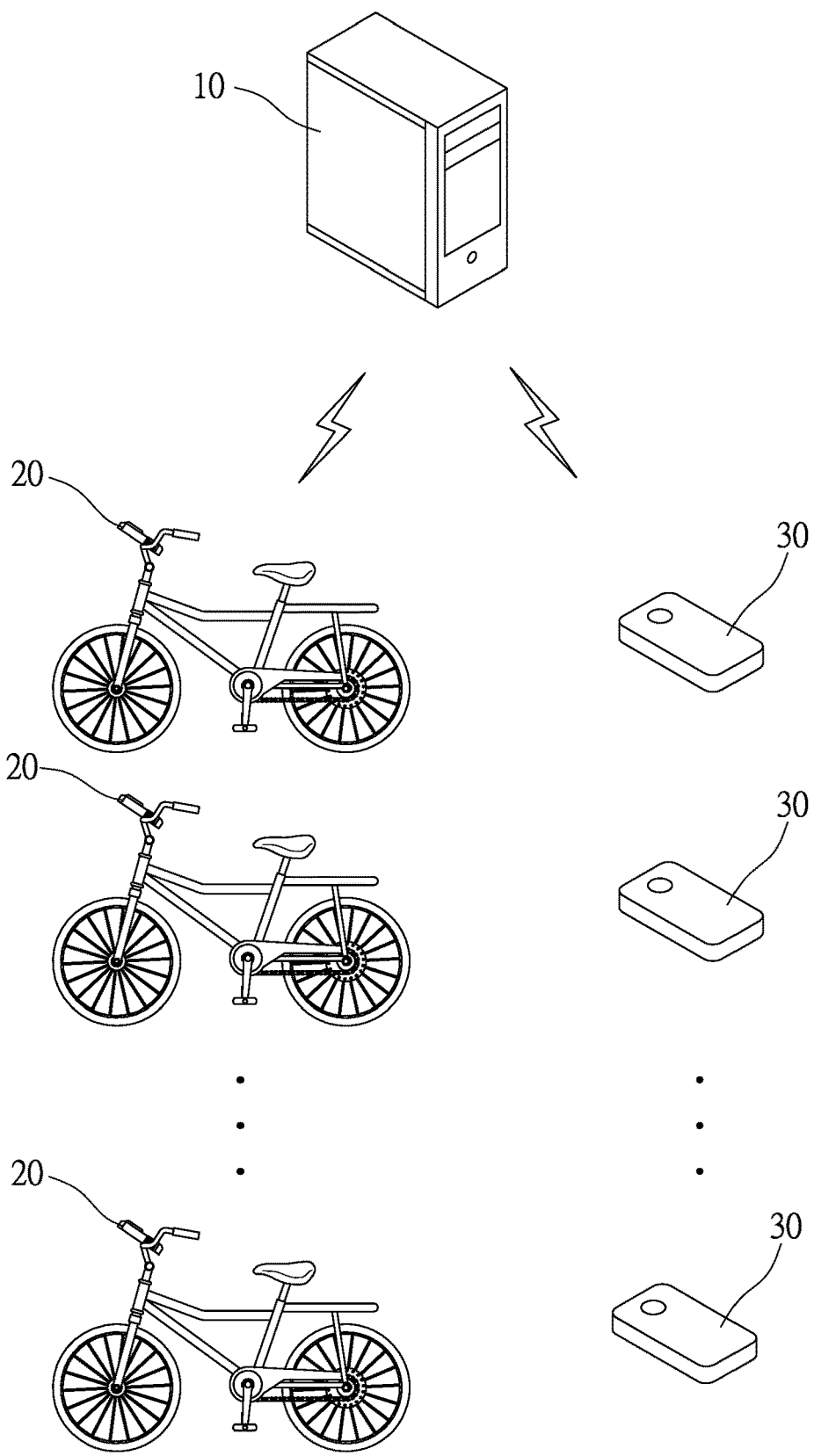
FIG. 1 is a schematic view showing an arrangement of a system according to the present invention.
Figure 2:
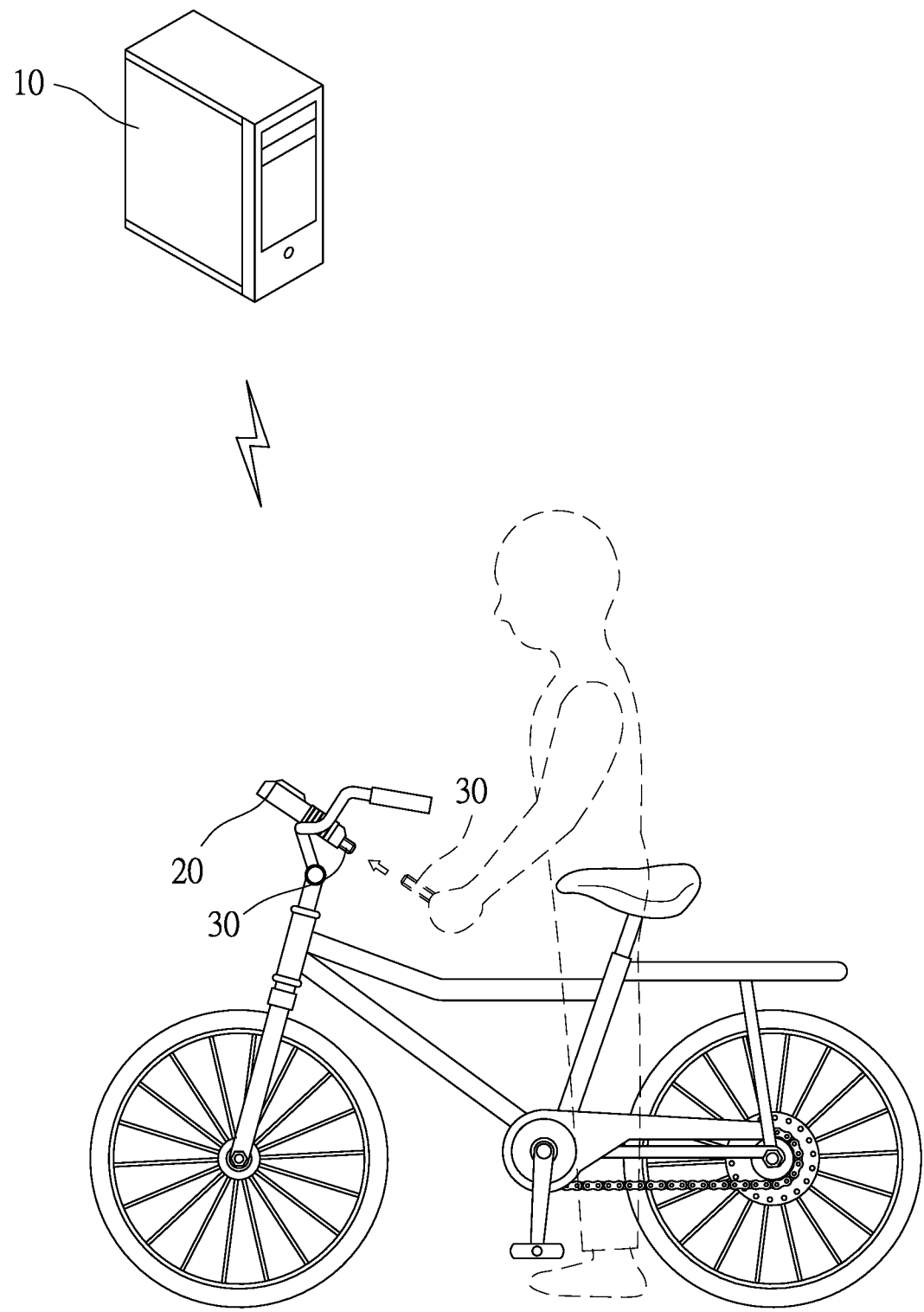
FIG. 2 is a schematic view showing a condition of a practical use of the system according to the present invention.

The present invention provides a batteryless electric bicycle based operation system, of which a primary arrangement is shown in FIGS. 1 and 2. The system comprises a server device 10, at least one electricity-connecting detection device 20 mountable on an electric bicycle, and at least one mobile electric power computation device 30 carriable by a user, wherein the server device 10 includes functions of registration and authentication, receipt/transmission of data and instructions, operation trading, carbon footprint recording, carbon credit calculation, memory, and communication; the electricity-connecting detection device 20 includes functions of detecting an operation parameter (such as a parameter of rotational speed, location, mileage, loading, energy consumption, speed, or operation time that can be used to accomplish an operation task, such as calculation of carbon credit) of the electric bicycle in connection therewith, receiving/transmitting data and instructions, receiving electric power to the electric bicycle, and communication; the electric bicycle is an electric bicycle that does not include a battery or is not equipped with a battery; the mobile electric power computation device 30 includes functions of electric power storage, conversion between electric power and digital currency, optional charging/discharging of electric power, operation trading, carbon footprint recording, carbon credit calculation, memory, and communication, so that the mobile electric power computation devices 30 are optionally operable to electrically connect with the electricity-connecting detection device 20 of the electric bicycle, in order to allow electric power stored in the mobile electric power computation device 30 to supply operation power required for the electric bicycle corresponding thereto, and the mobile electric power computation devices 30 and the electricity-connecting detection devices 20 optionally set in communication connection with the server device 10 to transmit data and issue instructions.

A method provided according to present invention for application to the above-described system comprises the following steps:

(a) the electricity-connecting detection device of the electric bicycle detecting that the mobile electric power computation device is set to form electric connection therewith: a user disposes a mobile electric power computation device 30 owned thereby and having electric energy stored therein into an electric bicycle to be used thereby for electrically connecting to the electricity-connecting detection device 20, so that the electricity-connecting detection device 20 of the electric bicycle detects and forms electric connection with the mobile electric power computation device 30 to make the mobile electric power computation device 30 enter a state of being ready to transmit electric power to the electric bicycle;

(b) registration data of the mobile electric power computation device and the electricity-connecting detection device being uploaded to the server device for authentication: when the electricity-connecting detection device 20 of the electric bicycle confirms that the electric connection thereof with the mobile electric power computation device 30 is formed, the mobile electric power computation device 30 and the electricity-connecting detection device 20 are simultaneously activated to upload registration data thereof to the server device 10 to carry out authentication of the electricity-connecting detection device 20 and the mobile electric power computation device 30;

(c) the mobile electric power computation device being notified upon successful authentication to supply electricity to the electric bicycle to be used thereby: when the server device 10 confirms that the electricity-connecting detection device 20 of the electric bicycle and the mobile electric power computation device 30 are a legally registered user, the server device 10 notifies the mobile electric power computation device 30 to supply electricity to the electric bicycle connected with the electricity-connecting detection device 20 to be used thereby. According to some embodiments, which are used for personal measures of burglarproofness, wherein the server device 10, when confirming that the mobile electric power computation device 30 is bonded with the electricity-connecting detection device 20 of the electric bicycle, implements an operation of unlocking the electricity-connecting detection device 20 of the electric bicycle, otherwise in case that the mobile electric power computation device 30 is not bonded with the electricity-connecting detection device 20 of the electric bicycle, the user may not activate the electric bicycle for operation, this fulfilling a burglar-proof effect. Further, according to some embodiments, which are used for rental of sharing electric bicycle, wherein the server device 10, when confirming that the mobile electric power computation device 30 and the electricity-connecting detection device 20 of the electric bicycle are a legally registered user, starts up rental service and trading of the mobile electric power computation device 30, otherwise one of the electricity-connecting detection device 20 and the mobile electric power computation device 30 is not a legally registered user, and the rental service of the electric bicycle is terminated;

(d) the electricity-connecting detection device detecting at least one operation parameter of the electric bicycle: when the electricity-connecting detection device 20 of the electric bicycle is legally activated, the electricity-connecting detection device 20 is operable to detect an operation parameter of the electric bicycle, wherein the operation parameter includes, but not limited thereto, an operation parameter, such as rotational speed, location, mileage, loading, energy consumption, speed, or operation time of the electric bicycle, which can be used to accomplish an operation task, such as calculation of carbon credit;

(e) transmitting the operation parameter to the server device and the mobile electric power computation device: when the electric bicycle finishes the operation of a current round, after the electricity-connecting detection device 20 detects the operation parameters, the electricity-connecting detection device 20 transmits the operation parameter that includes the carbon credit calculation or trading to the server device 10 and the mobile electric power computation device 30; and (f) applying the operation parameter to accomplish an operation task: after the operation parameter is received by the server device 10 and the mobile electric power computation device 30, the operation parameter is used to accomplish an operation task, wherein the operation task can be calculation of carbon emission and carbon credit for carbon reduction, transaction with digital currency, or trading calculation for rental-sharing.

Moreover, the present invention further comprises a computer program product. The computer program product includes a program code instruction. The program code instruction, when executed in the server device 10, the electricity-connecting detection device 20, and the mobile electric power computation device 30, may perform the above method to accomplish an operation task of at least one electric bicycle.

A practical way of implementing the present invention can be better realized with the following embodiments, such as:

Embodiment 1: Activating Operation of Batteryless Electric Bicycle

As shown in FIGS. 1 and 2, a batteryless electric bicycle is provided with an electricity-connecting detection device 20, and a user holds at least one mobile electric power computation device 30. Each mobile electric power computation device 30 memorizes electricity capacity and digital currency for conducting electricity trading and stored electricity for charging/discharging. The user may connect the mobile electric power computation device 30 owned thereto to the electricity-connecting detection device 20 of the electric bicycle to be ridden thereby, so that after the electricity-connecting detection device 20 detects completion of electric connection with the mobile electric power computation device 30, the electricity-connecting detection device 20 uses and supplies the electricity stored in the mobile electric power computation device 30 to a drive motor of the electric bicycle, so that with such an arrangement associated with the batteryless electric bicycle, after finishing riding, the user may take away the mobile electric power computation device 30, and the electric bicycle, during the idle time, does not have electricity stored therein and losing therefrom, and thus, the electric power of the mobile electric power computation device 30 can be then subsequently used in other electricity-driving equipment, this not only lowering down the battery cost and the electric bicycle loading, and also fulfilling an effect of environmental protection.

Embodiment 2: Implementing Unlocking of Batteryless Electric Bicycle

Figure 3:
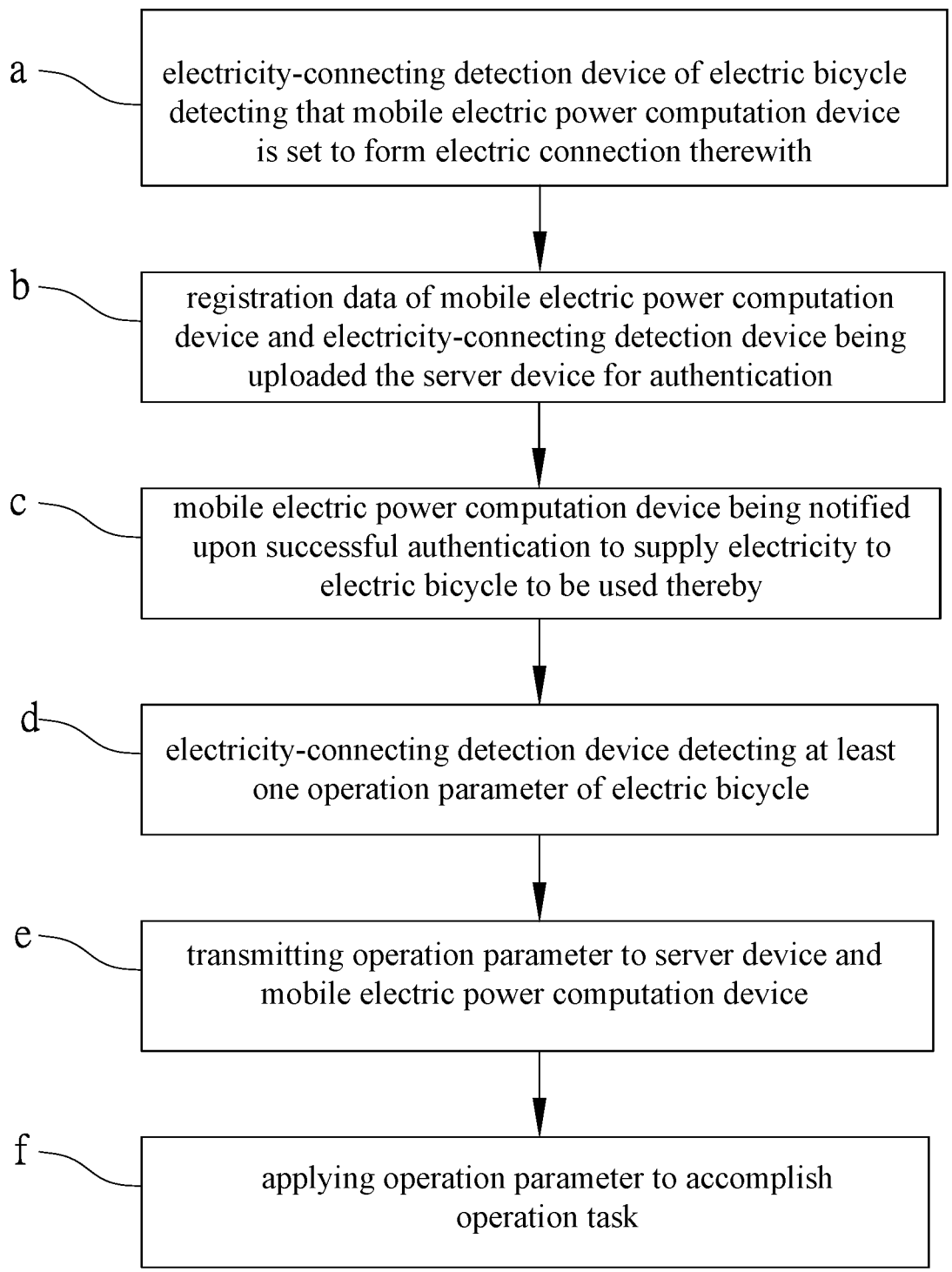
FIG. 3 is a schematic view illustrating a flow chart of a method according to the present invention.

The batteryless electric bicycle that is equipped with the electricity-connecting detection device 20 can be an electric bicycle owned by a user or a family, and the electricity-connecting detection device 20 can be bonded with at least one mobile electric power computation device 30. As shown in FIGS. 1, 2, and 3, when the user uses a personally owned mobile electric power computation device 30 to connect with the electricity-connecting detection device 20 of the electric bicycle to be ridden thereby, the electricity-connecting detection device 20 detects the mobile electric power computation device 30 and completes electric connection therewith and the registration data of the electricity-connecting detection device 20 and the mobile electric power computation device 30 are uploaded to the server device 10, so that after the server device 10 authenticates the electricity-connecting detection device 20 being legally bondable to the mobile electric power computation device 30, the electricity stored in the mobile electric power computation device 30 is supplied by the electricity-connecting detection device 20 to the drive motor of the electric bicycle in order to proceed with riding of the batteryless electric bicycle, otherwise, the server device 10, upon identifying the mobile electric power computation device 30 is not a mobile electric power computation device 30 legally bondable to the electricity-connecting detection device 20, cut off the electric connection between the mobile electric power computation device 30 and the electricity-connecting detection device 20, so that the user of the mobile electric power computation device 30 is not allowed to ride, and thus, an effect of burglarproofness is achieved.

Embodiment 3: Implementing Rental-Sharing Service of Batteryless Electric Bicycle The batteryless electric bicycle that is equipped with the electricity-connecting detection device 20 is a sharable electric bicycle. A user, in an attempt of using a mobile electric power computation device 30 owned thereby to rent a batteryless electric bicycle, may connect the mobile electric power computation device 30 owned thereby to an electricity-connecting detection device 20 of a sharable batteryless electric bicycle to be ridden thereby, and the electricity-connecting detection device 20 detects completion of electric connection by the mobile electric power computation device 30, and transmits registration data of the electricity-connecting detection device 20 and the mobile electric power computation device 30 to the server device 10, so that after the server device 10 authenticates the mobile electric power computation device 30 being eligible for the electricity-connecting detection device 20, the user may use the electricity stored in the mobile electric power computation device 30 to be supplied by the electricity-connecting detection device 20 to a drive motor of the batteryless electric bicycle to proceed with riding of the batteryless electric bicycle, and may use, after the completion of riding, the server device 10 and the mobile electric power computation device 30 to perform conversion for the digital currency required for the rental so as to complete rental transaction of the shareable batteryless electric bicycle.

Embodiment 4: Trading of Carbon Credit

As shown in FIGS. 1, 2, and 3, when a user rides a batteryless electric bicycle that is equipped with an electricity-connecting detection device 20, including but not limited to an individual owned or sharable batteryless electric bicycle, the user, when connecting an individual owned (including private or sharable) mobile electric power computation device 30 to the electricity-connecting detection device 20 of the batteryless electric bicycle, may use the electricity-connecting detection device 20 to detect completion of electric connection with the mobile electric power computation device 30, and transmit registration data of the electricity-connecting detection device 20 and the mobile electric power computation device 30 to the server device 10 for authentication, allowing the user to use the electricity stored in the mobile electric power computation device 30 to supply to a drive motor of the batteryless electric bicycle by the electricity-connecting detection device 20 in order to proceed with riding of the batteryless electric bicycle, and when the batteryless electric bicycle is activated and running, the electricity-connecting detection device 20 detects an operation parameter of the batteryless electric bicycle, which includes, but not limited to, 定 rotational speed, location, mileage, loading, energy consumption, speed, or operation time, and transmits the operation parameter to the server device 10 and the mobile electric power computation device 30, so that when the server device 10 and the mobile electric power computation device 30, upon receiving the operation parameter, may proceed with calculation of carbon credit trading based on accumulation of carbon footprint, and the server device 10 converts the carbon credit that is granted to the user into digital currency to be deposited in an account owned thereby and the mobile electric power computation device 30, thereby completing the entire trading of carbon credit.

It is appreciated from the above that the system, the method, and the computer program product according to the present invention are applicable to a batteryless electric bicycle to allow the batteryless electric bicycle to use an arrangement of an electricity-connecting detection device 20 thereon to allow the user who owns a mobile electric power computation device 30 to proceed with optional electric connection, so as to use the electricity stored in the mobile electric power computation device 30 to supply, by means of the electricity-connecting detection device 20, electricity to the batteryless electric bicycle, and to further use communication connection of the electricity-connecting detection device 20 and the mobile electric power computation device 30 with the server device 10 to fulfill transaction of carbon credit and rental, so as to allow the user to remove the mobile electric power computation device 30 after riding, making the batteryless electric bicycle not inducing losing of unused electricity during idling to thereby allow the electricity of the mobile electric power computation device 30 to be subsequently used in other electricity-driving equipment. This helps reduces waste of battery electricity and also lowering battery cost and loading of the electric bicycle, and being effective in reducing the total amount of carbon emission by means of the operation of a market mechanism, thereby achieving an effect of environmental protection and further creating an economic effect to thereby enhance the added value of the product.

I claim:

1. A method for operating an electric bicycle system, the electric bicycle system comprising:

a server device, which is responsive to at least one instruction to execute at least one computer program for performing data processing;

at least one electricity-connecting detection device, which is mounted on an electric bicycle for optionally activating the electric bicycle, the electricity-connecting detection device being operable to establish communication connection with the server device, the electricity-connecting detection device being operable to detect at least one operation parameter of the electric bicycle; and at least one mobile electric power computation device, which is removably connect to the electricity-connecting detection device to operationally form electric connection with the electricity-connecting detection device and to supply electricity to the electricity-connecting detection device to a drive motor that drives the electric bicycle, the mobile electric power computation device being operable to form communication connection with the server device, the mobile electric power computation device having functions of storage of electricity and charging/discharging;

wherein the method comprises:

(a) the electricity-connecting detection device of the electric bicycle detecting that the mobile electric power computation device is set to form electric connection therewith;

(b) registration data of the mobile electric power computation device and the electricity-connecting detection device being uploaded to the server device for authentication, wherein the mobile electric power computation device is confirmed as being bonded with the electricity-connecting detection device of the electric bicycle;

(c) the mobile electric power computation device being notified upon successful authentication to supply electricity to the electric bicycle to be used thereby, wherein the mobile electric power computation device supplies electricity to the drive motor that drives the electric bicycle;

(d) the electricity-connecting detection device detecting the at least one operation parameter of the electric bicycle;

(e) transmitting the operation parameter to the server device and the mobile electric power computation device; and (f) applying the operation parameter to accomplish an operation task.

2. The method according to claim 1, wherein the at least one operation parameter of the electric bicycle detected by the electricity-connecting detection device is transmitted to the mobile electric power computation device, which includes functions of recording carbon footprint of the operation task, calculating carbon credit based on the at least one operation parameter, and memory.

3. The method according to claim 2, wherein the mobile electric power computation device determines digital currency required for transaction by means of the server device based on the carbon credit, and further includes functions of digital currency transaction and memory.

4. The method according to claim 1, wherein the mobile electric power computation device implements conversion for digital currency required for rental by means of the server device, and further includes functions of transaction calculation for rental-sharing.

5. The method according to claim 1, wherein the operation parameter comprises one of rotational speed, location, milage, loading, energy consumption, speed, or operation time of the electric bicycle, and the operation task comprises calculation of carbon emission and carbon credit based on the operation parameter.

6. The method according to claim 1, wherein the operation parameter so transmitted comprises one of rotational speed, location, milage, loading, energy consumption, speed, or operation time of the electric bicycle, and the operation task comprises digital currency trading executed with the operation parameter.

7. The method according to claim 1, wherein the operation parameter so transmitted comprises one of rotational speed, location, milage, loading, energy consumption, speed, or operation time of the electric bicycle, and the operation task comprises shareable electric bicycle rental transaction performed with the operation parameter.

8. A computer program product, the computer program product comprising a program code instruction, the program code instruction being executable in a server device, at least one electricity-connecting detection device, and at least one mobile electric power computation device to implement the method according to claim 1 to accomplish the operation task of the electric bicycle.

* * * * *